United States Patent

Park

[11] Patent Number: 5,971,546
[45] Date of Patent: Oct. 26, 1999

[54] IMAGE DISPLAY DEVICE

[75] Inventor: Tae Soo Park, Seoul, Rep. of Korea

[73] Assignee: LG Electronics Inc., Seoul, Rep. of Korea

[21] Appl. No.: 08/874,741

[22] Filed: Jun. 13, 1997

[30] Foreign Application Priority Data

Jun. 15, 1996 [KR] Rep. of Korea ...................... 96-21663
Mar. 11, 1997 [KR] Rep. of Korea ........................ 97-8052

[51] Int. Cl.⁶ ................................................. G03B 21/14
[52] U.S. Cl. ................................ 353/38; 353/31; 345/56
[58] Field of Search ..................................... 353/38.31, 46,
353/22, 122; 349/5, 7, 57, 99, 102, 103,
109, 196, 201, 202; 345/32, 56, 61; 359/639,
640, 495

[56] References Cited

U.S. PATENT DOCUMENTS

| 5,005,968 | 4/1991 | Tejima et al. ............................... 353/38 |
| 5,028,121 | 7/1991 | Baur et al. .................................. 353/31 |
| 5,250,967 | 10/1993 | Miyashita .................................. 353/38 |
| 5,300,942 | 4/1994 | Dolgoff ...................................... 353/38 |
| 5,537,256 | 7/1996 | Fergason .................................. 359/495 |
| 5,572,341 | 11/1996 | Fergason .................................... 359/94 |
| 5,715,029 | 2/1998 | Fergason .................................. 349/196 |
| 5,755,501 | 5/1998 | Shinohara et al. ......................... 353/38 |
| 5,757,341 | 5/1998 | Clarke et al. ............................... 349/95 |

FOREIGN PATENT DOCUMENTS 843764 2/1996 Japan.

OTHER PUBLICATIONS

Fergason, J. et al.; Proceedings of the SPIE–The International Society for Optical Engineering vol: 2650,p. 122–30, "Application of time–based multiplexing to LCD projection displays", Conf. Date Jan. 29–31 1996.

*Primary Examiner*—William Dowling

[57] ABSTRACT

An image display device includes a light source, a flat display panel for forming an image in units of picture elements by using an incident light generated from the light source, and at least one double refraction plate for dividing the picture elements of the image formed by the flat display panel into duplication picture elements and shifting them to other positions independent of the original picture elements. The double refraction plate uses an amplitude division method to divide and shift the picture elements to a distance of $\frac{3}{2}P_x$, wherein $P_x$ is pitch between adjacent picture elements as displayed. An arrangement of two double refraction plates in sequence and an arrangement of three double refraction plates in sequence may be used to increase the picture elements four and eight times in number, respectively.

54 Claims, 17 Drawing Sheets serve as clearance vertical direction
horizontal direction F I G.22
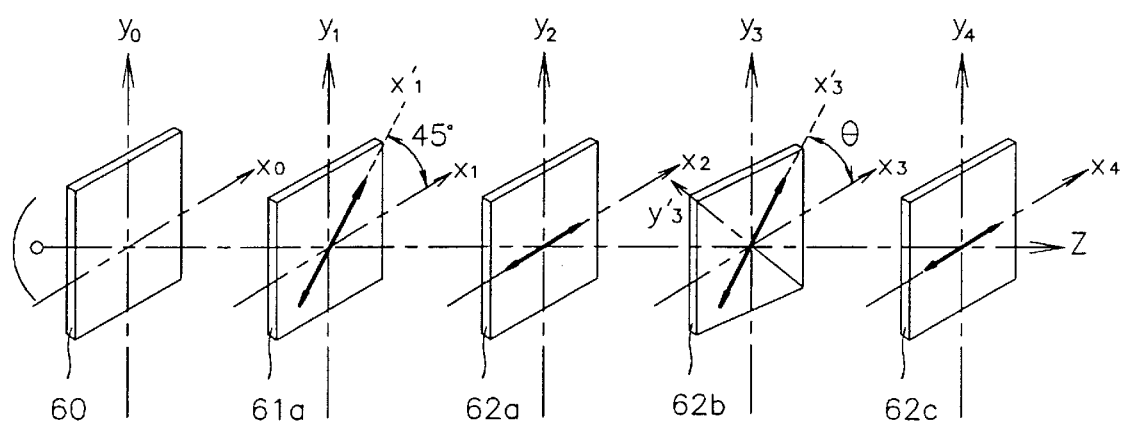

F I G.23a
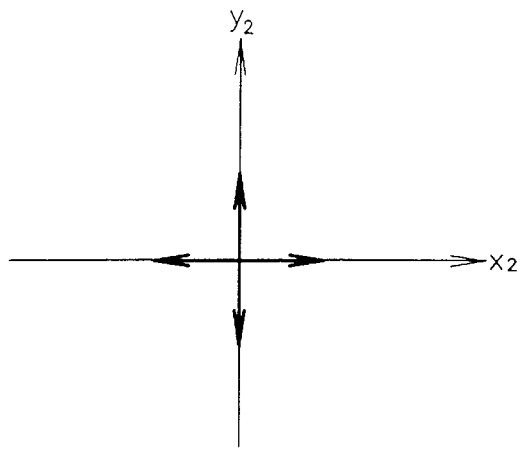
F I G.23b
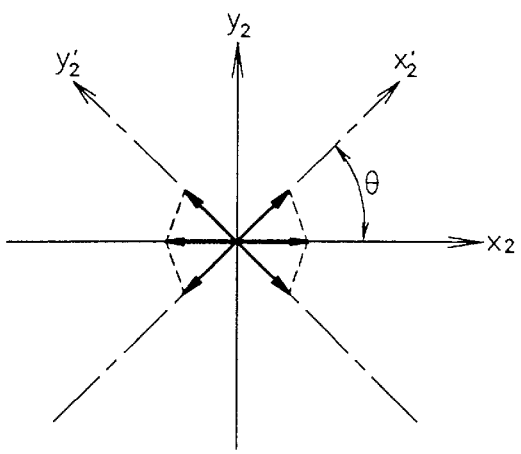
F I G.23c
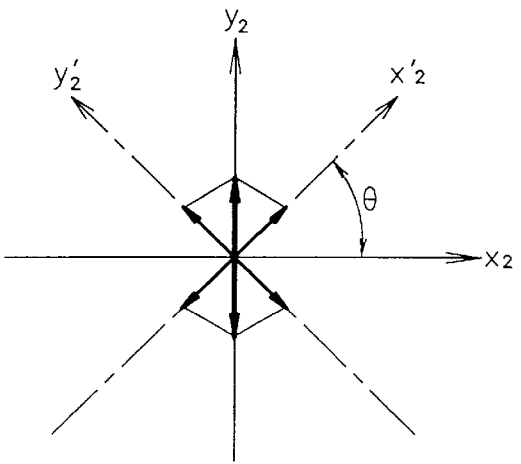

F I G. 24
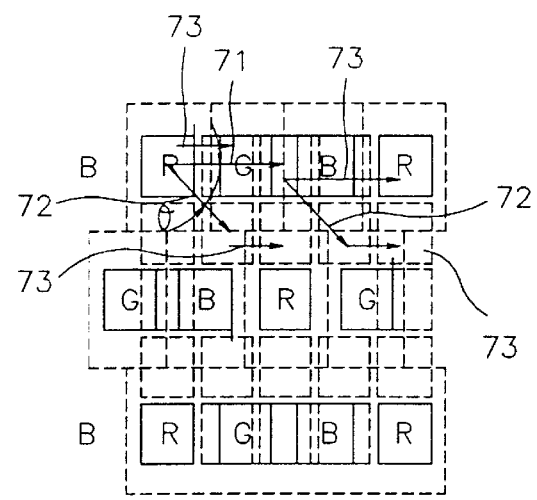
F I G. 25
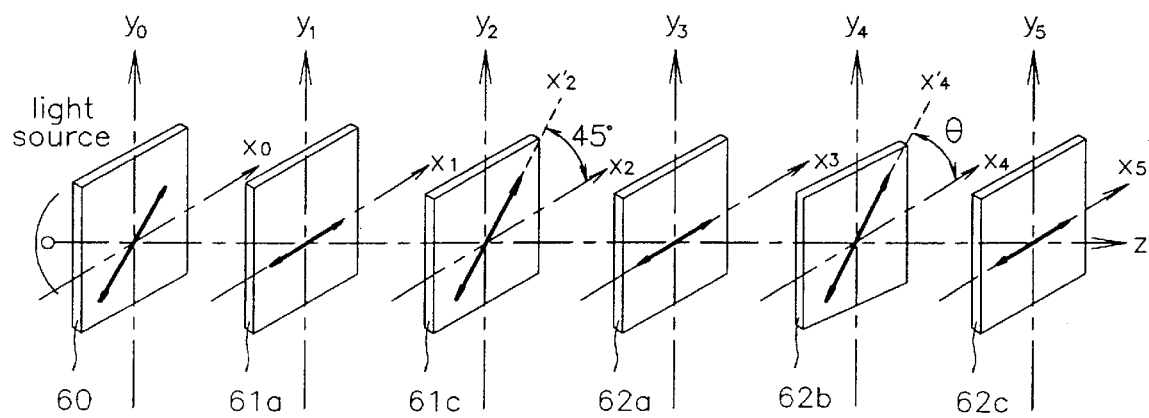

F I G. 26
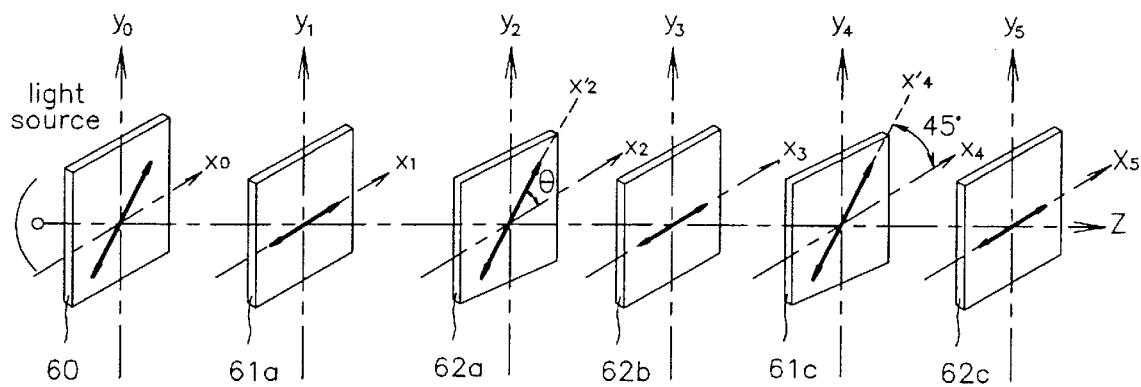
F I G. 27
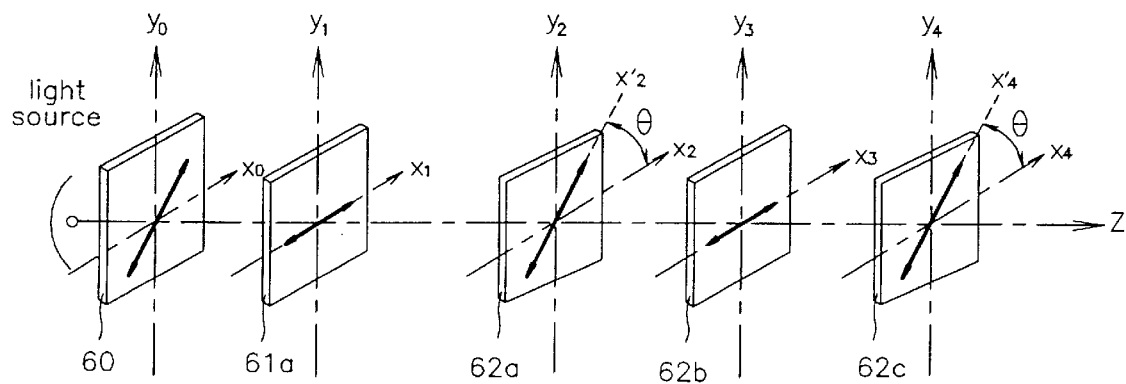

F I G.28
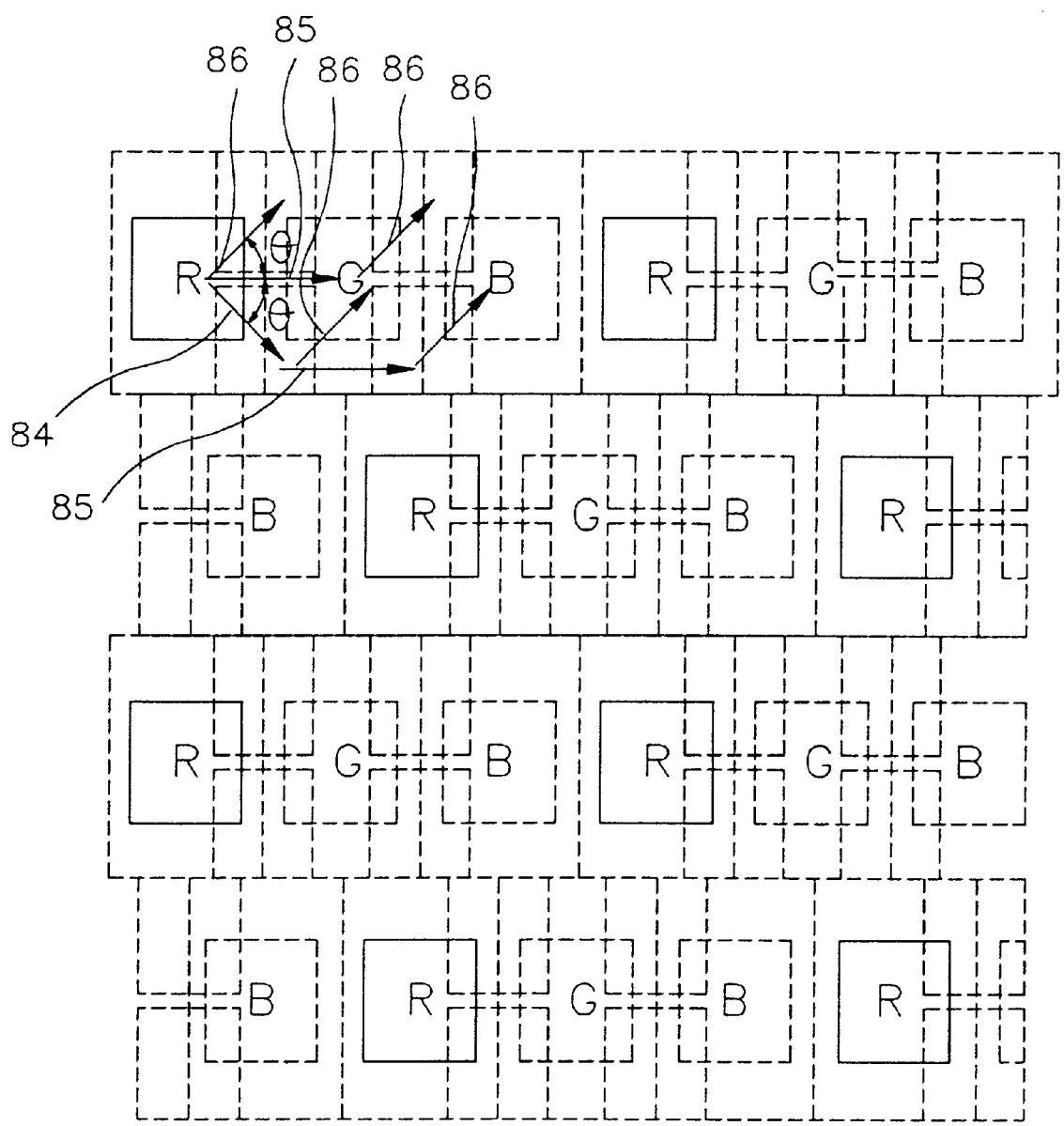

IMAGE DISPLAY DEVICE

BACKGROUND OF THE INVENTION

1. Field of the Invention

The present invention relates to an image display device and, more particularly, to a projection type image display device which is designed to enhance the quality of image by using the image division and shift method.

2. Discussion of Related Art

In general, flat panels, especially projection type image display devices with a liquid crystal display panel are implemented by real and virtual image techniques.

The real image technique is a method of displaying a real image by using an optical system as shown in FIG. 1. The optical system comprises a liquid crystal display panel 11, an eyepiece lens 12, and a screen 13. The liquid crystal panel 11 is positioned out of the focal distance f of the eyepiece lens 12 to display the real image projected on the screen 13.

The virtual image technique is a method of displaying a virtual image on a screen. FIG. 2 is a schematic of an optical instrument of the projection type image display device using a general virtual image technique. The optical instrument comprises an eyepiece 14, a liquid crystal display panel 15, and a screen 16. Unlike the real image technique, the liquid crystal panel 15 is positioned within the focal distance f of the eyepiece lens 14 to project the virtual image through the liquid crystal display panel 15 and display it on the screen 16.

The image of the liquid crystal display panel is projected on the screen in either case.

The type of the liquid crystal display panel is classified by the pattern of an array of picture elements; delta and stripe type patterns.

In the delta type pattern, as shown in FIG. 3, RGB color filters are horizontally arranged in sequence. The picture elements of one color in a horizontal line are horizontally moved by three halves the picture element in the adjacent horizontal lines.

Similarly, RGB color filters are horizontally arranged in sequence in the stripe type pattern, as shown in FIG. 4. But, the picture elements of one color in a horizontal line are located at the same vertical position in the adjacent horizontal lines.

Beside the liquid crystal display panel, flat panels to project an image include PDP, FED, and DMD panels. For all the flat panels, the image is projected in a larger size on the screen.

The flat panel comprises an opening section that allows a ray to pass therethrough, and opaque zones. The opaque zones are unavoidably formed from the circuits for energizing each picture element and other structural constructions constituting the panel.

For example, when an image by red, green and blue picture elements is enlarged and projected, a part of the image is not displayed on the screen due to the opaque zones between the picture elements.

FIG. 5 shows the intervals formed by the opaque zones 20 between the red, green and blue picture elements 17, 18 and 19 on the screen, where the opaque zones 20 on the screen are caused by those between the three picture elements on the liquid crystal display panel.

The picture elements are recognized as they are separated with the opaque zones unless they are observed at a good distance from the screen. If the picture elements that constitute an image are recognized in the case that they are not observed at a good distance from the screen, the image formed appears unnatural and rough. The intervals formed by the opaque zones are shown as a mosaic pattern in the image on the screen, which deteriorates the quality of image.

Since the light generated from the light source is screened by the opaque zones, there may be a loss of the quantity of light passing through the light path.

To eliminate the deterioration of the quality of image due to the opaque zones, as shown in FIG. 5, the picture elements 17, 18 and 19 are divided into two parts: original picture elements 17, 18 and 19 and duplication picture elements 17a, 18a and 19a and the duplication picture elements are shifted to such a distance that the opaque zones are eliminated with them. Both images by the original and shifted duplication picture elements are simultaneously displayed on the screen.

A plurality of images duplicated are shifted in different directions and to a distance shorter than the cycle $P_x$ of the picture element so as to eliminate the opaque zones. The cycle $P_x$ of the picture element is the distance between adjacent two picture elements and the horizontal pitch of the picture element on a liquid crystal display panel.

The key point of this is that the picture element (image) is duplicated into a plurality of picture elements (images) and the images by the original and duplication picture elements are projected onto the screen, thus eliminating the opaque zones to prevent the deterioration of the quality of image.

A wavefront division method is used to divide the wave of light propagating from the image on the LCD panel into a plurality of duplication images. FIG. 6 is a schematic of a projection type image display device using a flat plate in accordance with an example of the prior art, disclosed in U.S. Pat. No. 5,250,967. FIG. 7 is a schematic of a projection type image display device using a polyhedral prism in accordance with another example of the prior art, disclosed in U.S. Pat. No. 5,005,968. In the above mentioned examples, an optical unit is provided near the iris of the projection optical system, to divide the image into a plurality of images to a designated distance less than the cycle of the picture element.

Referring to FIG. 6, the projection type image display device using a flat plate comprises a light source 21, a liquid crystal display panel 22, an iris 23, a polyhedral flat plate 24, a projecting lens 25, and a screen 26. The liquid crystal display panel 22 produces an image to be projected onto the screen 26. The light containing image information is incident on the polyhedral flat panel 24 via the iris 23. The light on the polyhedral flat panel 24 is divided into a plurality of images, being projected onto the screen 26 through the projecting lens 25. Thus formed duplication image is shown in FIG. 5.

As shown in FIG. 7, the incident light is however scattered at border lines (edges) 24a, 24b and 24c of the polyhedral flat plate 24. Thus the quality of image is deteriorated irrespective of the elimination of the opaque zones by the projection type image display device in FIG. 6.

Since the polyhedral flat plate 24 must be inserted before the iris of the projection optical system, the installation of the projecting lens and image projection display system is limited by the configuration of the projection optical system. The polyhedral flat plate 24 to attain an accurate quantity of division and shift is also hard to manufacture.

Referring to FIG. 8, the conventional projection type image display device using a polyhedral prism comprises a light source 30, a liquid crystal display panel 31, an iris 32, a projecting lens 33, a polyhedral prism 34, and a screen 35. The liquid crystal display panel 31 produces an image to be projected onto the screen 35. The light containing the image information is incident upon the polyhedral prism 34 via the iris 32 and projecting lens 33. The light on the polyhedral prism 34 is divided into an original image by the original picture elements and a duplication image by the duplication picture elements, and projected onto the screen 26. Thus formed duplication image is shown in FIG. 5.

In a similar manner as illustrated in FIG. 7, the incident light is divided and shifted by a plurality of faces of the polyhedral prism 34 to generate an original image and a duplication image 27b. The projection type display device using a polyhedral prism as shown in FIG. 8 also has the same problems with the projection type display device using a polyhedral flat plate in FIG. 6.

Further another example of the prior art to eliminate the opaque zones is disclosed in JP Publication No. 8-43764, dividing the picture elements into the duplication picture elements and projecting the image by the original picture elements and the duplication image shifted onto a screen. The duplication image is shifted to a distance as large as the opaque zones in one picture element that is only enough not to overlap the adjacent two picture elements. As described in FIG. 9, the duplication image 36a is shifted to a distance of maximum ½$P_x$, that is, a half the cycle of the picture element.

Opaque zones due to another picture element of a different color cannot be removed at all. Referring to FIG. 9, when only R picture element is used, or the quantity of light is concentrated only R picture element, G and B picture elements serve as opaque zones, with respect to the R picture element. Due to the opaque zones, the image displayed is unnatural and the opaque zones appear in the image as a mosaic pattern. This problem pertaining the opaque zones is to unavoidable in the above mentioned examples disclosed in U.S. Pat. No. 5,250,967 and U.S. Pat. No. 5,005,968.

To eliminate the opaque zones, a micro lens array sheet (U.S. Pat. No. 5,300,942) or a grating sheet is suggested for further another example. Each of micro lens must be arranged exactly corresponding to each picture element on a liquid crystal display panel. The deterioration of the quality of image is not avoidable because of a scattering of light at the border portions of the micro lens. For the grating sheet, unwanted scattering of light occurs at the edge of the grating plate and a moire appears in the image due to the interference between the grating plate and LCD panel. The image formed by the conventional liquid crystal display panel must be observed at a distance from the screen, which requires sufficient space for watching the screen.

SUMMARY OF THE INVENTION

Accordingly, the present invention is directed to an image display device that substantially obviates one or more of the problems due to limitations and disadvantages of the related art.

An object of the present invention is to provide an image display device that divides the picture elements of the image formed by a flat display panel into original picture elements and the duplication picture elements with an amplitude division method and shifts the duplication picture elements to the region between the other picture elements of the same color, thus increasing the number of the picture elements and enhancing the quality of images.

Another object of the present invention is to provide an image display device using at least one double refraction plate to divide and shift the image without the deterioration of the quality of images due to a scattering of light.

Another object of the present invention is to provide an image display device that is provided with at least one double refraction plate near a flat display panel irrespective of other optical devices, to simplify the construction of the optical system and facilitate the installation of it.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the image display device comprises a light source, a flat display panel for forming an image in units of picture elements by using an incident light generated from the light source, and a double refraction plate for dividing the picture elements of the image formed by the flat display panel into the original picture elements and the duplication picture elements and shifting them to other positions independent of the original picture elements.

The double refraction plate employs the amplitude division method to divide and shift the picture elements formed on the flat display panel to a distance of ½$P_x$ ($P_x$ is the cycle of the picture element), thus increasing the number of the picture elements of an image projected onto the screen.

Two double refraction plates are arranged in sequence to divide and shift the picture elements of the image formed on the flat display panel, thus increasing the picture elements four times in number.

Three double refraction plates are arranged in sequence to divide and shift the picture elements of the image formed on the flat display panel, thus increasing the picture elements eight times in number.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

FIG. 22 is a view showing the crystalline optic axes of the double refraction plates when the polarization axis of the liquid crystal display panel is positioned in a 45-degree incline according to the third preferred embodiment of the present invention;

FIG. 23a illustrates the polarization of the light passing through the first refraction plate in FIG. 22;

FIG. 23b illustrates the divided components of the light polarized along the x axis;

FIG. 23c illustrates the divided components of the light polarized along the y axis;

FIG. 24 shows the R picture elements increased eight times in number according to the third preferred embodiment of the present invention;

FIG. 25 is a view showing the axes of the double refraction plates and new polarizer when the polarization axis of the liquid crystal display panel is horizontally positioned according to an example of the third preferred embodiment of the present invention;

FIG. 26 is a view showing the axes of the double refraction plates and new polarizer when the polarization axis of the liquid crystal display panel is horizontally positioned according to another example of the third preferred embodiment of the present invention;

FIG. 27 is a view showing the crystalline optic axes of the double refraction plates when the polarization axis of the liquid crystal display panel is horizontally positioned according to the third preferred embodiment of the present invention; and FIG. 28 shows the division and shift of the picture elements increased eight times in number according to the third preferred embodiment of the present invention as shown in FIG. 27.

DETAILED DESCRIPTION OF PREFERRED EMBODIMENT

Reference will now be made in detail to the preferred embodiments of the present invention, examples of which are illustrated in the accompanying drawings.

Figure 1:
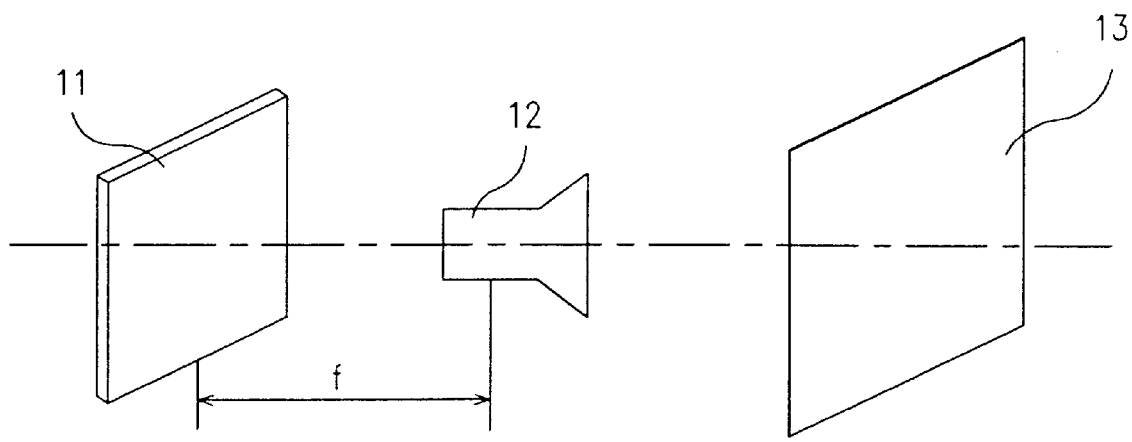
FIG. 1 is a schematic of an optical instrument of the projection type image display device using a general real image technique.
Figure 2:
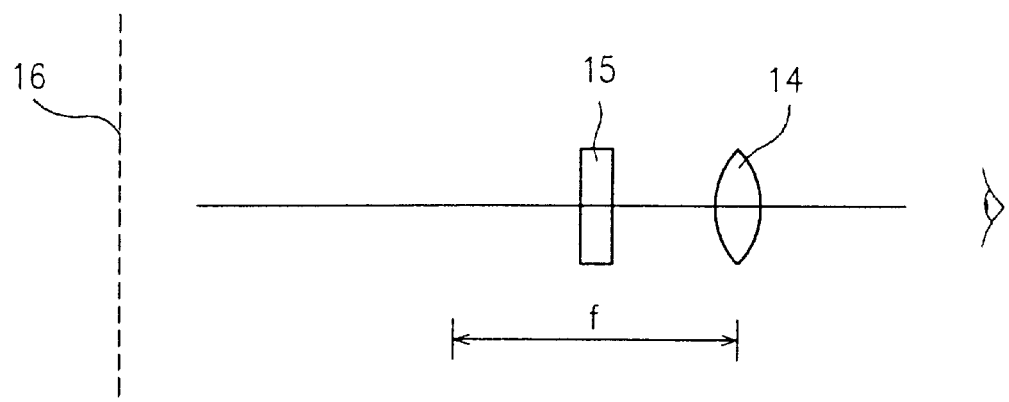
FIG. 2 is a schematic of an optical instrument of the projection type image display device using a general virtual image technique.
Figure 3:
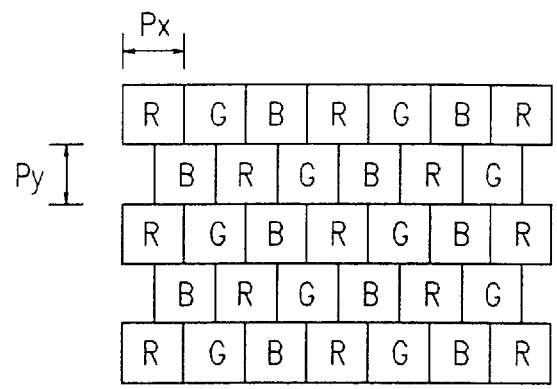
FIG. 3 shows the array of picture elements in a general delta type pattern.
Figure 4:
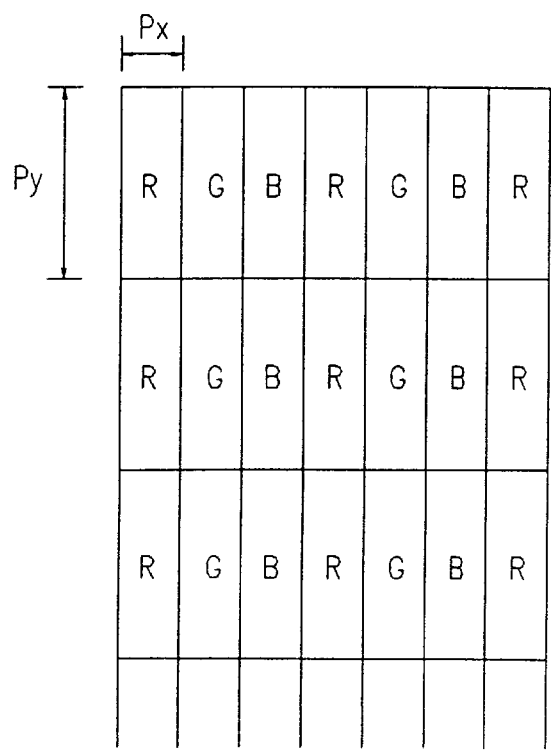
FIG. 4 shows the array of picture elements in a general stripe type pattern.
Figure 5:
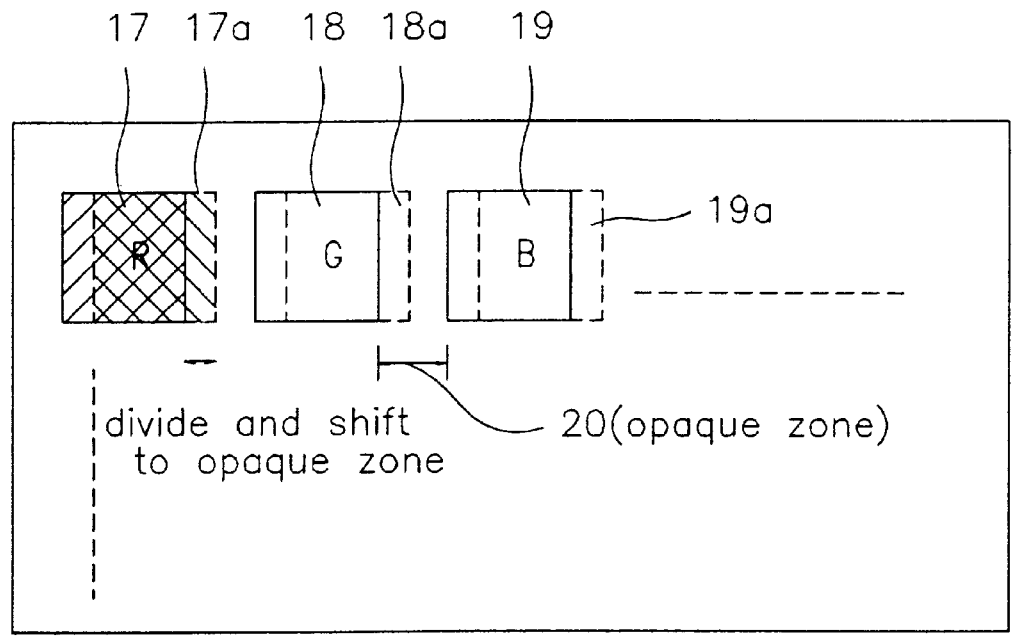
FIG. 5 is an explanatory view of the division and shift of an image according to a prior art.
Figure 6:
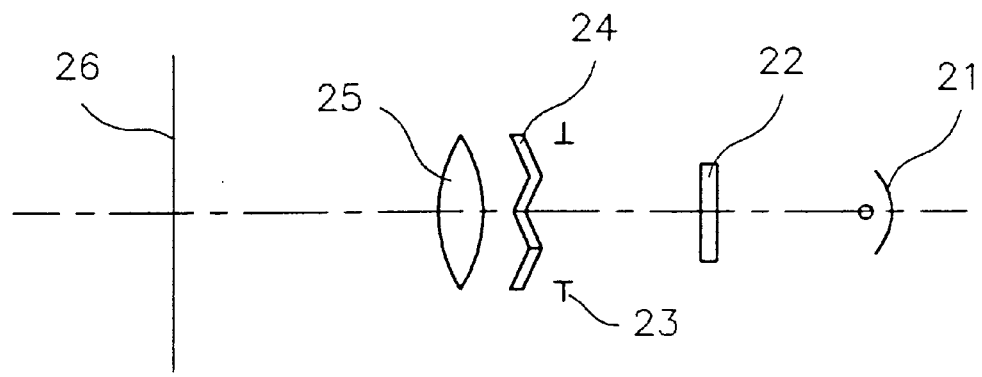
FIG. 6 is a schematic of an optical system according to an example of the conventional projection type image display device.
Figure 7:
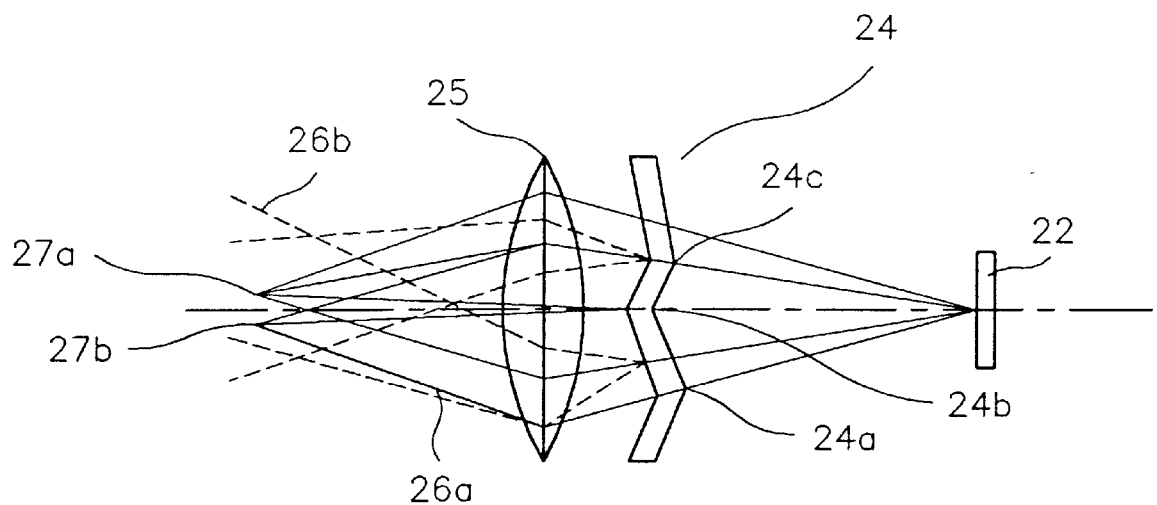
FIG. 7 is an explanatory view of the scattering of light by a wavefront division method of the optical system in FIG. 6.
Figure 8:
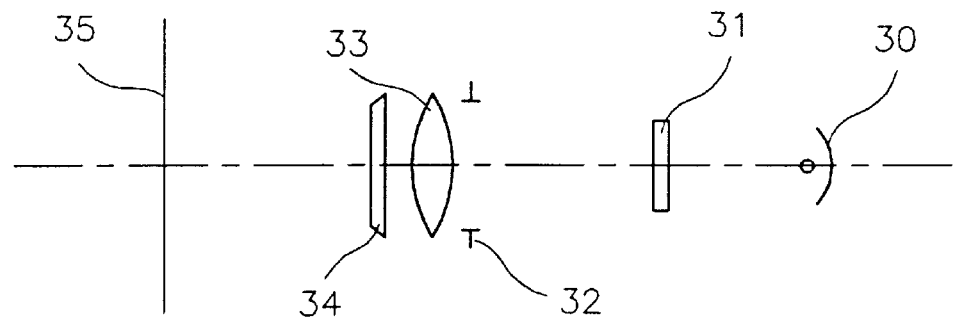
FIG. 8 is a schematic of an optical system according to another example of the conventional projection type image display device.
Figure 9:
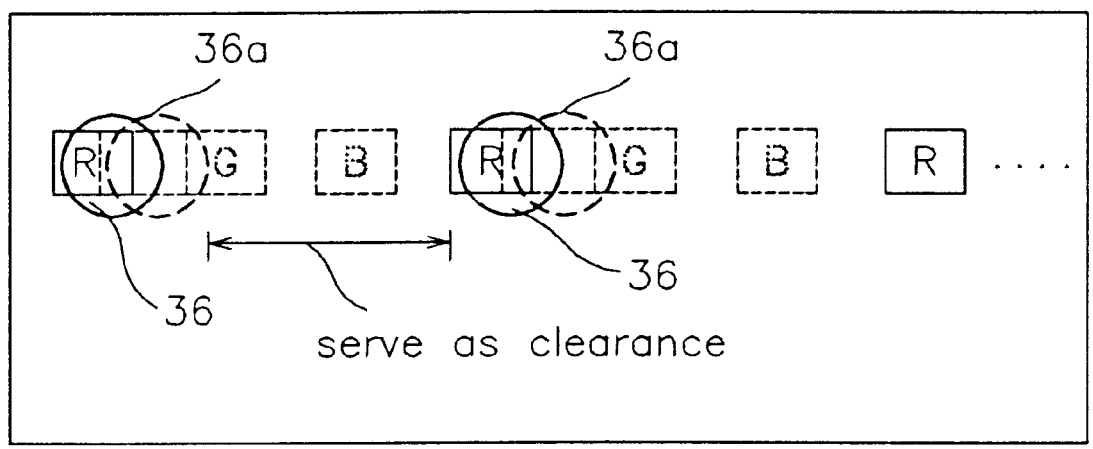
FIG. 9 is an explanatory view of the opaque zones formed by picture elements of another color according to the prior art.
Figure 10:
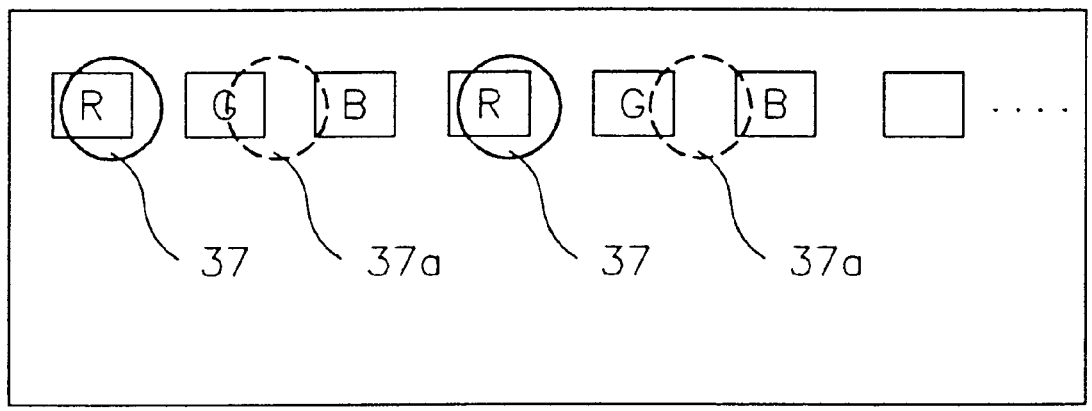
FIG. 10 is an explanatory view of the division and shift of an image by an image display device according to the present invention.

FIG. 10 is an explanatory view of the division and shift of an image on the image display device according to the present invention. Referring to FIG. 10, each RGB picture element that forms an image on the screen is duplicated into a plurality of RGB picture elements and shifted to a distance longer than the cycle of the unit picture element.

For example, in the delta type pattern of the picture elements, each of the duplication picture elements is shifted to a distance as long as at least one horizontal cycle and half the vertical cycle of the unit picture element.

Each of the duplicated picture elements is moved to a different position from the original ones, that is, to the position of another color picture element, so that no overlap occurs between the original and duplication picture elements and thus the picture elements are actually doubled in quantity.

As shown in FIG. 10, an R picture element 37 is duplicated into a duplication R picture element 37a and the duplication picture element 37a is shifted to a distance as long as at least one horizontal cycle, $\frac{3}{2}P_x$. The duplication R picture element 37a is positioned between G and B picture elements, thus increasing the number of picture elements two times. With this, the opaque zones can be eliminated by the duplication picture elements.

FIRST EMBODIMENT

Figure 11:
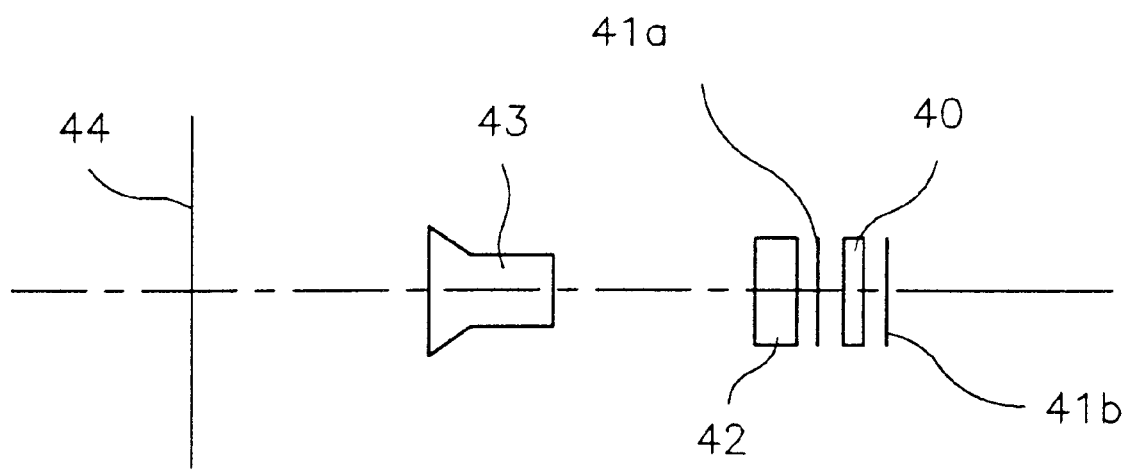
FIG. 11 is a schematic of an optical system of the image display device according to a first preferred embodiment of the present invention.

FIG. 11 is a schematic of an optical system using the division and shift as shown in FIG. 10, in the image display device according to a first preferred embodiment of the present invention.

The flat display panel of the present invention may be a kind of single plate type using the stripe type array of picture elements as well as PDP, FED, DMD panels and the like.

Referring to FIG. 11, the optical system comprises a liquid crystal display panel 40 for displaying an image by picture elements, polarizers 41a and 41b for polarizing the light having picture information displayed on the liquid crystal display panel 40, a double refraction plate 42 forming an optical system for dividing and shifting the light that passes through the polarizer 41a, a projecting lens 43 for enlarging and projecting the light divided and shifted, and a screen 44 for making an image thereon.

The polarizer 41a has a polarization axis positioned in a 45-degree incline with respect to the crystalline optic axis of the double refraction plate 42.

The light having the image information displayed on the liquid crystal display panel 40 has either one of horizontal and vertical components with respect to the ground. According to the first embodiment, the polarizer 41a polarizes the light to have both horizontal and vertical components with respect to the ground in the direction of propagation.

The light passing through the polarizer 41a is incident upon the double refraction plate 42. The double refraction plate 42 divides the picture element of the incident light into two picture elements and transmits them into the projecting lens 43.

The projecting lens 43 projects one of the two picture elements onto the screen 44 to display an original image and projects the other one onto the screen to display a duplication image.

Figure 12:
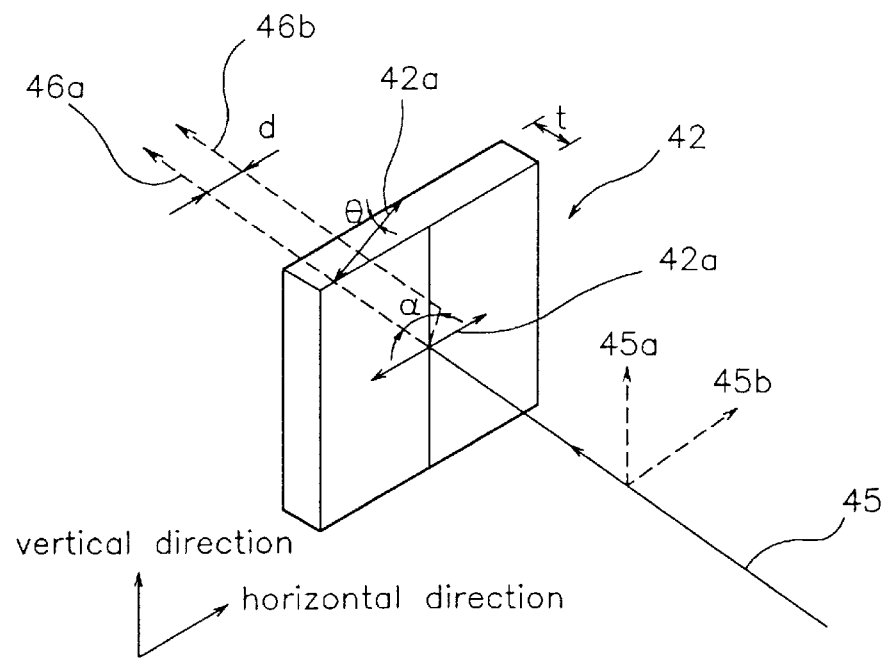
FIG. 12 is an explanatory view of the light transmission and refraction in the double refraction plate according to the present invention.
Figure 13:
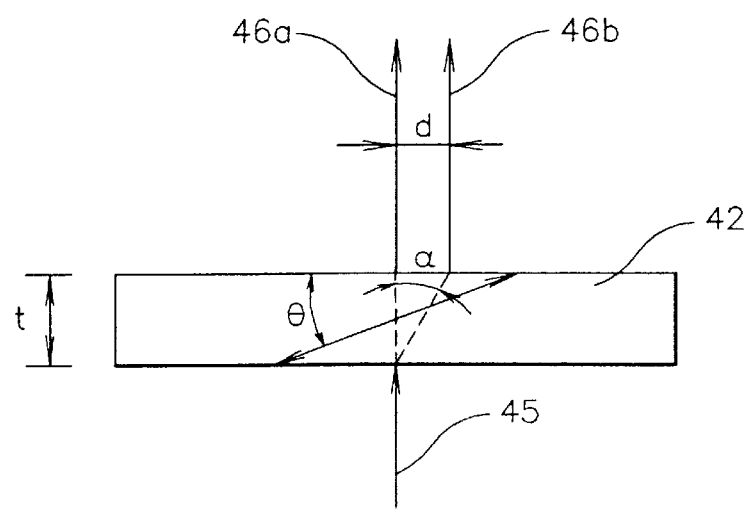
FIG. 13 is a detail view of FIG. 11.

FIGS. 12 and 13 illustrate the structure and principle of the double refraction plate 42 that divides the image into two images and shifts either of the two images, as described above.

Referring to FIGS. 12 and 13, the crystalline optic axis 42a of the double refraction plate 42 is positioned in a designated degree e incline with respect to the incident light 45 from the direction of thickness t of the double refraction plate 42.

The incident light 45 passes through the polarizer 41a to have both horizontal and vertical components 45a and 45b in its direction of propagation.

The double refraction plate 42 divides the incident light 45 into two rays according to the direction of propagation with respect to the crystalline optic axis. One of the two rays polarized is a vertical component 45a of the direction of propagation and corresponds to an original image 46a. The other one is a horizontal component 45b of the direction of propagation, forming a duplication image 46b shifted to a designated distance from the original image 46a. Such is the amplitude division and shift.

The duplication image 46b has duplicated image information. The quantity d of shift is larger than the cycle $P_x$ of the unit picture element, and corresponds to $\tfrac{3}{2}P_x$ in FIG. 10.

The quantity of shift d is determined from the equation 1 given by $$d = t\frac{(n_o^2 - n_e^2)\tan\theta}{n_o^2 + n_e^2\tan^2\theta}$$

where $n_e$ is the refraction index of an extraordinary ray, $n_o$ is the refraction index of an ordinary ray and t is the thickness of the double refraction plate 42.

The light that travels straight is the ordinary ray being a horizontal component with respect to the ground in the direction of propagation. The extraordinary ray, that is, the light shifted to a distance d is a vertical component with respect to the ground in the direction of propagation.

The double refraction plate 42 may be made of quartz, calcite, $LiNbO_3$ and the like that exhibit double refraction.

As shown in the equation 1, the number of picture elements on the liquid crystal display panel 40 can be doubled by adequately regulating the thickness t and optic axis 42a of the double refraction plate 42.

For example, when the distance d is $\tfrac{3}{2}P_x$ ($P_x$ is the horizontal pitch of a picture element on the liquid crystal display panel), the image generated by the double refraction plate 42 is enlarged and projected onto the screen 44 through the projecting lens 43, thus increasing the number of picture elements two times.

As shown in FIG. 10, the original image 37 is duplicated into the image 37a having all information of the original image 37 and the duplication image 37a is shifted to another position independently separated from the original image 37.

Since duplication image 37a is shifted to a distance of $\tfrac{3}{2}P_x$, the picture element is doubled in number and the clearance by another colored picture element is accordingly reduced.

Figure 14:
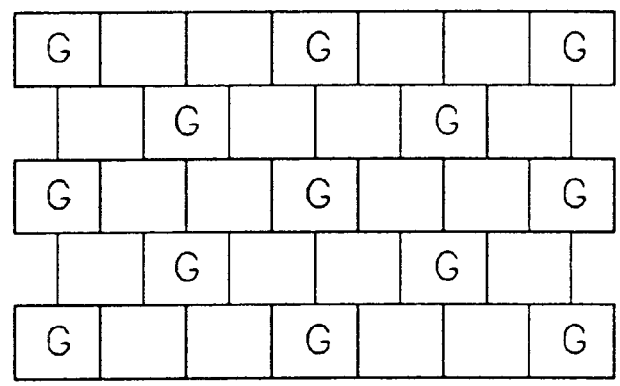
FIG. 14 shows the array of green picture elements in the delta type pattern.
Figure 15:
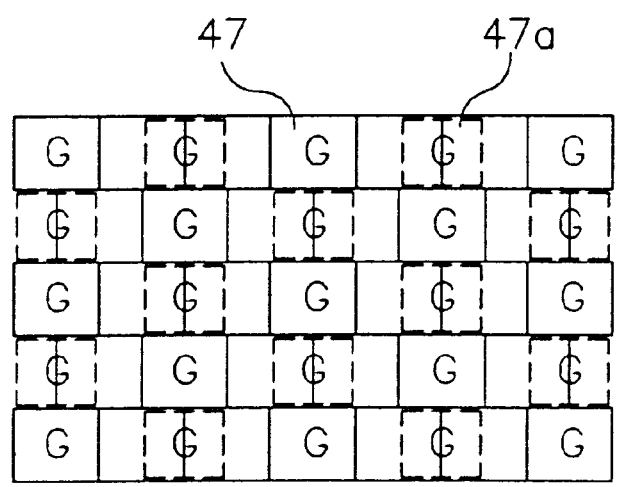
FIG. 15 shows the green picture elements divided and shifted by the image display device according to the present invention.

Similarly in FIGS. 14 and 15, when G picture element in the delta type array of picture elements is divided and shifted, the number of G picture elements can be doubled with the original and duplication G picture elements 47 and 47a. B picture element can also be doubled in number in the same manner described above.

Thus the image with the quality by doubled picture elements is projected onto the screen 44. When the quantity of shift d is $\tfrac{3}{2}P_x$ with respect to the horizontal direction, the delta type of the color filter pattern is converted to the stripe type.

The image can be divided and shifted to other positions horizontally with respect to the ground by regulating the crystalline optic axis of the double refraction plate 42. In this case, the picture elements of other colors are considered as opaque zones to shift the duplication picture elements to a distance larger than at least half the cycle of the picture element. It is also possible to divide and shift the image diagonally with respect to the ground.

The double refraction plate 42 is flat enough to prevent the deterioration of the quality of image that is generally caused by the scattering of light as observed in the conventional polyhedral flat plate and polyhedral prism. The double refraction plate 42 is installed near the flat display panel irrespective of other optical systems such as projecting lens, iris and the like.

The first embodiment as described above is directed to a system using no polyhedral optical devices such as polyhedral flat plate and polyhedral prism, thus drastically eliminating the deterioration of the quality of images caused by a scattering of light. The number of picture elements are doubled without decreasing the contrast by shifting the double picture elements to other positions of picture elements of the other colors that act as opaque zones between the picture elements. Thus the quality of image can be enhanced with a doubled picture elements.

The installation of the system and assembly arrangements are flexible because the double refraction plates of operations independent of other optical system are installed near the flat display panel.

Since the duplication picture elements are shifted to other positions apart from the original picture elements to increase the number of picture elements, a user can watch the image on the screen at a closer distance.

SECOND EMBODIMENT

Figure 16:
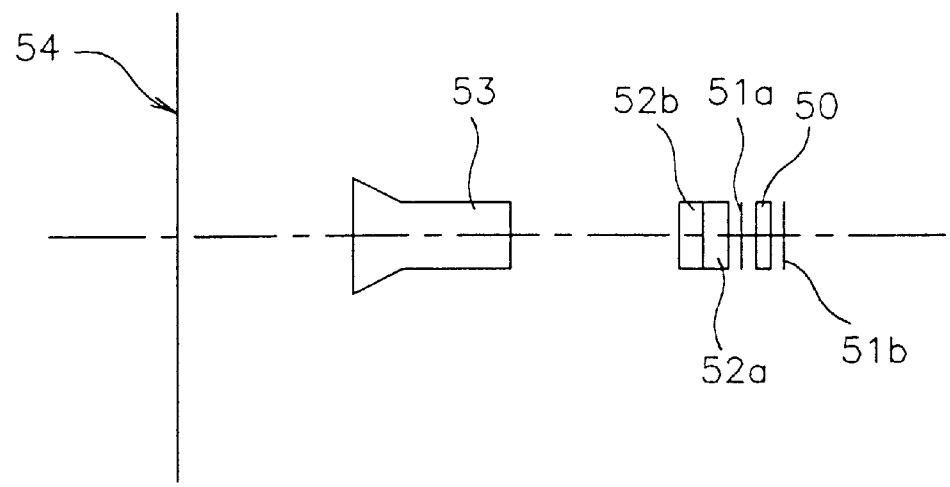
FIG. 16 is a schematic of an optical system of the image display device according to a second preferred embodiment of the present invention.

FIG. 16 is a schematic of an optical system in the projection type image display device according to a second preferred embodiment of the present invention, using a liquid crystal display panel of the delta type color filter pattern.

Referring to FIG. 16, the optical system comprises a liquid crystal display panel 50 for displaying an image by picture elements, polarizers 51a and 51b for polarizing the light having picture information displayed on the liquid crystal display panel 50, a pair of double refraction plates 52a and 52b constituting an optical system for dividing and shifting the light that passes through the polarizer 51a, a projecting lens 53 for enlarging and projecting the light divided and shifted, and a screen 54 for making an image enlarged by the projecting lens 53.

Figure 17:
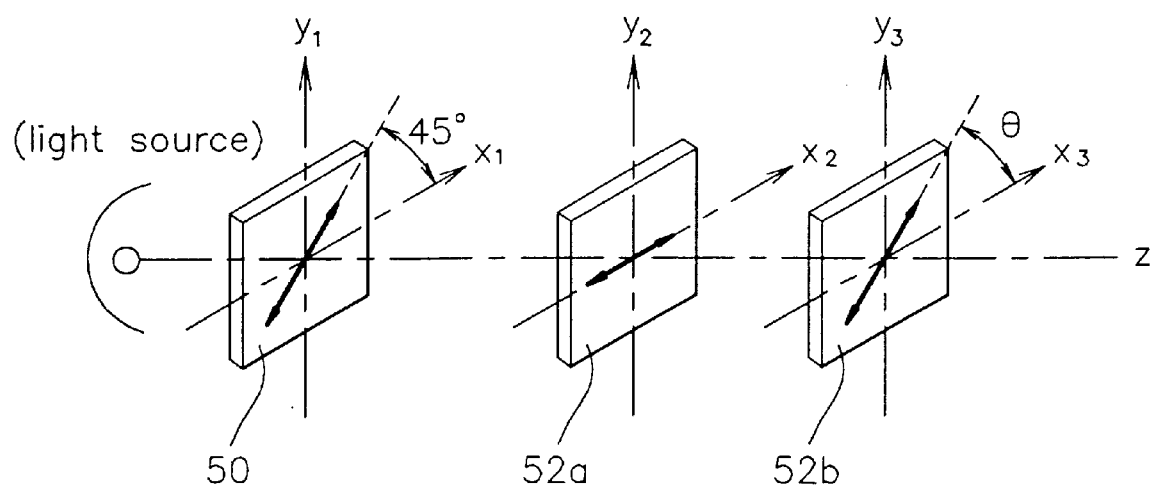
FIG. 17 is a view showing the crystalline optic axis of the double refraction plate when the polarization axis of the liquid crystal display panel is positioned in a 45-degree incline, according to the second preferred embodiment of the present invention.
Figure 20:
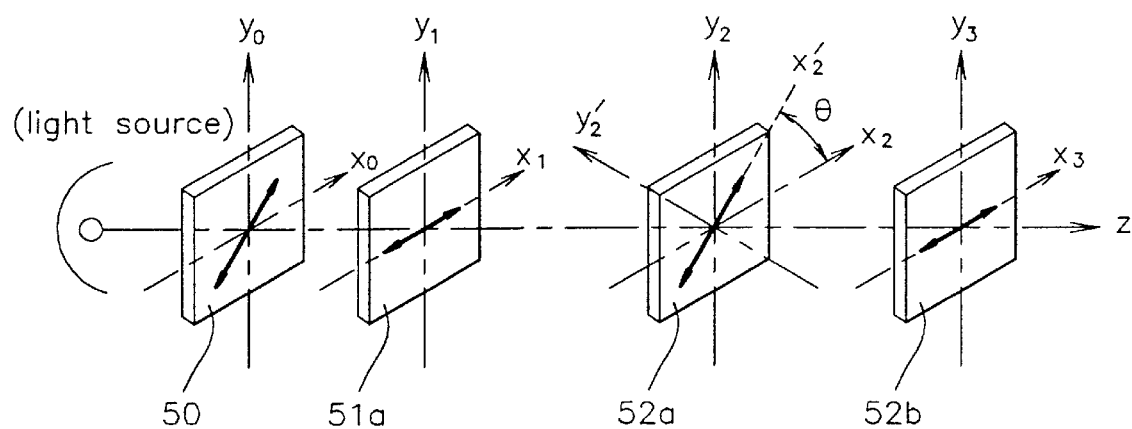
FIG. 20 is a view showing the crystalline optic axis of the double refraction plate when the polarization axis of the liquid crystal display panel is horizontally positioned according to the second preferred embodiment of the present invention.

The polarizer 51a mounted on the light-emerging side of the liquid crystal display panel 50 has a polarization axis in a 45-degree incline as shown in FIG. 17, or horizontal or perpendicular as shown in FIG. 20, with respect to the crystalline optic axis of the double refraction plate 52. The two double refraction plates 52a and 52b have the crystalline optic axes whose directions are determined according to each of the above cases.

Referring to FIG. 17, the polarizer of the liquid crystal display panel 50 has an axis in a 45-degree incline according to the second embodiment to increase the number of picture elements four times with the two double refraction plates. The crystalline optic axis of the first double refraction plate 52a is along the $X_2$ axis (in horizontal direction). The second double refraction plate 52b has a crystalline optic axis positioned in the $X_3'$ direction inclined by a designated degree θ with respect to the $X_3$ axis (in horizontal direction). The three axes $X_1$, $X_2$ and $X_3$ are all the same horizontal x axis, that is, $X_1=X_2=X_3$.

Thus the light passing through the liquid crystal display panel 50 has the direction of propagation in a 45-degree incline, by the polarizer 51a mounted on the light-emerging side of the liquid crystal display panel 50 that is positioned in a 45-degree incline.

Figure 18A:
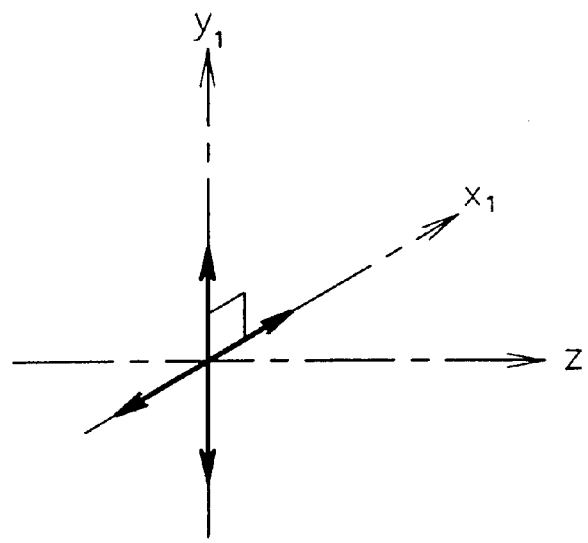
FIGS. 18 and 18b illustrate the polarization of the light passing through the first refraction plate in FIG. 17.

The light polarized by 45 degrees is divided into two components along the x and y axes: the horizontal component passes through the first double refraction plate 52a and is shifted to a distance $d(=\frac{3}{2}P_x)$ along the x axis, but the vertical component travels straight. Thus the picture elements passing through the first double refraction plate 52a is doubled in number. As shown in FIG. 18a, the light passing through the first double refraction plate 52a is polarized into two components $x_1$ (horizontal) and $y_1$ (vertical) in vibration.

Figure 18B:
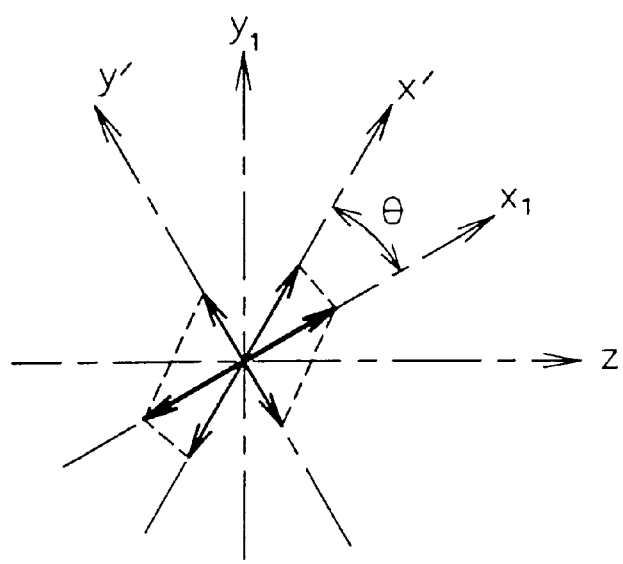

As shown in FIG. 18b, the horizontal component x is polarized again into two components with respect to the axes $x_1'$ and $y_1'$ that are inclined by a designated degree θ. Though not shown in FIG. 18b, the vertical component y can also be polarized into two components with respect to the axes $x_1'$ and $y_1'$. The intensity of light is $Ix_1'=I_0 \sin^2 θ$ for the $x_1'$ component, and $Iy_1'=I_0 \cos^2 θ'$ for the y' component.

Figure 19:
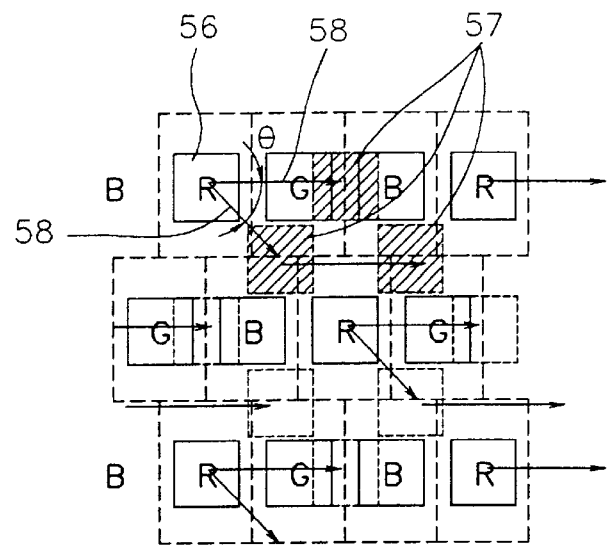
FIG. 19 illustrates the divided components of the light polarized along the x axis in FIG. 17.

As shown in FIG. 19, the picture elements (forming an image on the screen) on the liquid crystal display panel 50 can be incremented four times in number by adequately regulating the thickness t and crystalline optic axis $x_3'$ of the second double refraction plate 52b prior to dividing and shifting the light emerging from the first double refraction plate 52a.

Though not shown in FIG. 19, the number of G and B picture elements can be increased four times in the same manner of R picture elements. The inclination degree θ is properly determined depending on the pattern of opaque zones in the liquid crystal display panel 50. Referring to FIG. 19, the reference numerals 56, 57 and 58 indicate an original picture element, a duplication picture element and the shift direction of the duplication picture element, respectively.

FIG. 20 is a schematic of an optical system with the double reflection plates 52a and 52b according to the second embodiment of the present invention, in which the polarizer 52a mounted on the light-emerging side of the liquid crystal display panel 50 is positioned horizontally.

The second double refraction plate 52b has a crystalline optic axis along the $X_3$ axis (horizontal direction). That of the first double refraction plate 52a is positioned in the direction of the $x_2'$ axis inclined by a designated degree θ with respect to the $X_2$ axis.

The light emerging from the liquid crystal display panel 50 does not have the direction of propagation horizontal to the $x_0$ axis (horizontal direction). The light passing through the liquid crystal display panel 50 propagates horizontally with respect to the $x_1$ axis by the polarizer 51a mounted on the light-emerging side of the liquid crystal display panel 50, the polarizer 52a positioned along the polarization axis $x_1$.

The light polarized to the axis $x_1$ is divided into two components in the $x_2'$ (horizontal) and $y_2'$ directions: the horizontal component $x_2'$ passes through the first double refraction plate 52a and is shifted in the direction of $x_2'$ axis, but the component $y_2'$ travels straight.

The light passing through the first double refraction plate 52a is divided again into two components in the $X_3$ (horizontal) and $y_3$ (vertical) directions: the horizontal component $X_3$ passes through the second double refraction plate 52b and is shifted to a distance $d(=\frac{3}{2}P_x)$, but the vertical component $y_3$ travels straight.

As shown in FIG. 18b, the polarized light passing through the first double refraction plate 52a has two components along the axes $x_2'$ and $y_2'$ that are inclined by a designated degree θ. The intensity of light by each component is $Ix_2'=I_0 \sin^2 θ$ for the $x_2'$ component, and $Iy_2'=I_0 \cos^2 θ$ for the $y_2'$ component.

The four axes $X_0$ to $X_3$ are all the same horizontal x axis, that is, $X_0=X_1=X_2=X_3$.

Similarly in FIG. 19, the number of picture elements (forming an image on the screen) on the liquid crystal display panel 50 can be incremented four times by adequately regulating the thickness t and crystalline optic axis $X_3'$ of each of the first and second double refraction plates 52a and 52b prior to dividing and shifting the original picture elements.

The inclined degree θ is properly determined depending on the pattern of opaque zones in the liquid crystal display panel 50.

According to another example of the second embodiment, the polarizer 51a mounted on the light-emerging side of the liquid crystal display panel 50 has a polarization axis in a 90-degree incline and the double refraction plates are constructed with the same effect as shown in FIG. 20.

As described above, the thickness and crystalline optic axis of each of the two double refraction plates are adequately regulated before the original picture elements are divided and shifted to the positions of picture elements of a different color between adjacent picture elements of the same color. Thus the number of the picture elements can be increased four times without scattering the light.

THIRD EMBODIMENT

Figure 21:
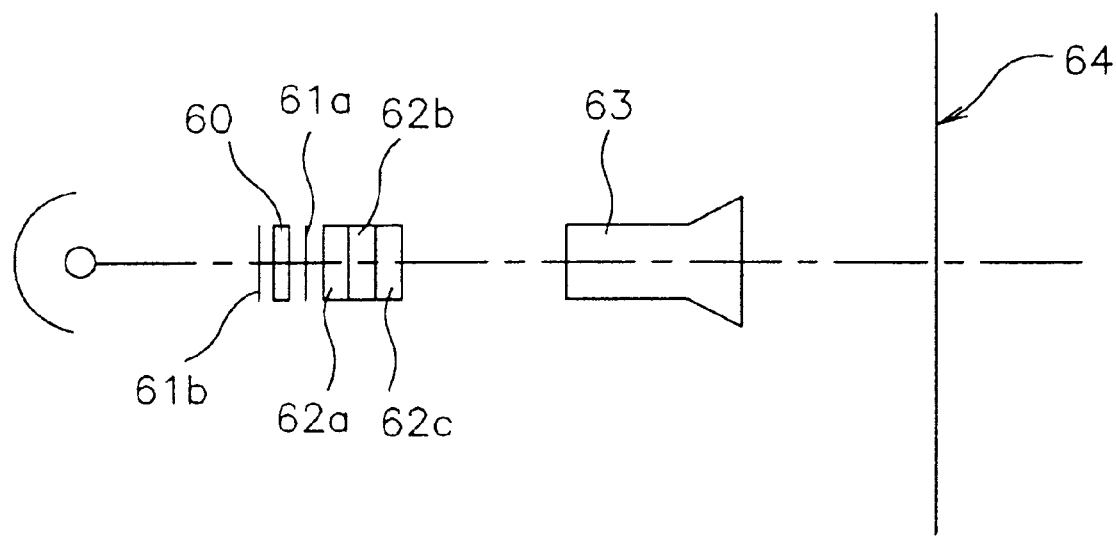
FIG. 21 is a schematic of an optical system of the projection type image display device according to a third preferred embodiment of the present invention.

FIG. 21 is a schematic of an optical system in the projection type image display device according to a third preferred embodiment of the present invention, using three double refraction plates 62a, 62b and 62c to increase the number of picture elements eight times. Referring to FIG. 21, the optical system is designed to have the same construction as shown in FIG. 16 except for the three double refraction plates 62a, 62b and 62c.

As shown in FIG. 22 showing an example of the third embodiment, the light emerging from a liquid crystal display panel 60 travels along the $x_0$ axis (horizontal direction). The light passing through the liquid crystal display panel 60 has the direction of propagation in a 45-degree incline with respect to the $x_1$ axis by a polarizer 61a mounted on the light-emerging side of the liquid crystal display panel 60.

The polarizer 61a is positioned in a 45-degree incline with respect to the $x_1$ axis.

The five axes $X_0$ to $X_4$ are all the same horizontal x axis, that is, $X_0=X_1=X_2=X_3=X_4$.

The light polarized by 45 degrees is divided into two components along the $x_2$ and $y_2$ axes: the horizontal component passes through the first double refraction plate 62a and is shifted to a distance $d(=3\ P_x)$ along the $x_2$ axis, but the vertical component $y_2$ travels straight. Thus the picture elements passing through the first double refraction plate 62a is doubled in number.

As shown in FIG. 23a, the light passing through the first double refraction plate 62a is polarized into two components $x_2$ (horizontal) and $y_2$ (vertical) in vibration. The horizontal component $x_2$ is polarized again into two components with respect to the axes $x_2'$ and $y_2'$ that are inclined by a designated degree θ, as shown in FIG. 23b. The vertical component $y_2$ can also be polarized into two components with respect to the axes $x_2'$ and $y_2'$. The intensity of light is $Ix_2'=I_0 \sin^2 θ$ for the $x_2'$ component, and $Iy_2'=I_0 \cos^2 θ$ for the $y_2'$ component.

The picture elements (forming an image on the screen) can be incremented four times in number by adequately regulating the thickness t and crystalline optic axis $x_3'$ of the second double refraction plate 62b prior to dividing and shifting the light emerging from the first double refraction plate 62a.

The light passing through the second double refraction plate 62b can also be divided into two components, increasing the number of the picture elements four times. The light then passes through the third double refraction plate 62c to be divided into two components in the same manner. The thickness of the third double refraction plate 62c is regulated to make the quantity of shift half the above $½P_x$.

Passing the third double refraction plate 62c, the original picture elements are incremented eight times in number and displayed on the screen as shown in FIG. 24. Referring to FIG. 24, the reference numerals 71, 72 and 73 indicate duplication picture elements generated by the first, second and third double refraction plates 62a, 62b and 62c, respectively.

FIG. 25 is a schematic of another example of an optical system with the double reflection plates 62a, 62b and 62c according to the third embodiment of the present invention, in which the polarizer mounted on the light-emerging side of the liquid crystal display panel is horizontally positioned. A polarizer 61c is located after the liquid crystal display panel 60.

The light emerging from the liquid crystal display panel 60 does not have the direction of propagation horizontal to the $x_0$ axis (horizontal direction). The light passing through the liquid crystal display panel 60 propagates horizontally with respect to the $x_1$ axis by the polarizer 61a mounted on the light-emerging side of the liquid crystal display panel 60.

The optical system for dividing the picture elements and shifting them comprises the first double refraction plate 62a along the $x_3$ axis, the second double refraction plate 62b along the $x_4'$ axis in a designated degree θ inclined with respect to the $x_4$ axis, and the third double refraction plate 62c along the $x_5$ axis. The six axes $X_0$ to $X_5$ are all the same horizontal x axis, that is, $X_0=X_1=X_2=X_3=X_4=X_5$.

The polarizer 61c has a polarization axis in a 45-degree incline to have the same distribution of light quantity before the first double refraction plate 62a and thus with the same effect with the projection type image display device in FIG. 22.

The polarizer 61c may be substituted with λ/4 or λ/2 plate. The λ/4 plate converts the direction of propagation of an incident light, from a linear polarization to a circular polarization, or from a circular polarization to a linear polarization. The λ/2 plate converts the direction of the linear polarization, from an extraordinary ray to an ordinary ray, or from an ordinary ray to an extraordinary ray.

FIG. 26 is a schematic of further another example of an optical system with the double reflection plates 62a, 62b and 62c according to the third embodiment of the present invention, in which the polarizer mounted on the light-emerging side of the liquid crystal display panel is horizontally positioned. The polarizer 61c is provided between the second and third double refraction plates 62b and 62c.

The light emerging from the liquid crystal display panel 60 does not have the direction of propagation horizontal to the $x_0$ axis (horizontal direction). The light passing through the liquid crystal display panel 60 propagates along the $x_1$ axis by the polarizer 61a mounted on the light-emerging side of the liquid crystal display panel 60.

The optical system for dividing the picture elements and shifting them comprises the first double refraction plate 62a along the $x_2'$ axis inclined by a designated degree θ with respect to the $x_2$ axis (horizontal direction), the second double refraction plate 62b along the $x_3$ axis (horizontal direction), and the third double refraction plate 62c along the $x_5$ axis (horizontal direction).

The polarizer 61c has a polarization axis in a 45-degree incline to have the same distribution of light quantity before the third double refraction plate 62c and thus with the same effect with the projection type image display device in FIG. 25. The six axes $X_0$ to $X_5$ are all the same horizontal x axis, that is, $X_0=X_1=X_2=X_3=X_4=X_5$. The polarizer 61c for rotating the direction of propagation may be substituted with a λ/4 or λ/2 plate.

FIG. 27 is a schematic of still another example of an optical system with the double reflection plates 62a, 62b and 62c according to the third embodiment of the present invention, in which the polarizer mounted on the light-emerging side of the liquid crystal display panel is horizontally positioned. The optical system for dividing the picture elements and shifting them comprises the first double refraction plate 62a positioned in a designated degree θ inclination with respect to the $x_2$ axis (horizontal direction), the second double refraction plate 62b along the $x_3$ axis (horizontal direction), and the third double refraction plate 62c in a designated degree 6 incline with respect to the $x_4$ axis (horizontal direction). The five axes $X_0$ to $X_4$ are all the same horizontal x axis, that is, $X_0=X_1=X_2=X_3=X_4$.

In the embodiment, the division and shift of a light is based on the sample principle as described above. The state of the light passing through the third double refraction plate 62c is shown in FIG. 28. Referring to FIG. 28, the reference numerals 84, 85 and 86 indicate duplication picture elements divided and shifted by the first, second and third double refraction plates 62a, 62b and 62c, respectively. The quantity of division and shift is adjustable by regulating the thickness of the double refraction plates to widen the effective openings without making any problem in resolution. According to the third embodiment, the openings are widened about six times by the overlapped portions.

As described above, the thickness and crystalline optic axis of each of the double refraction plates are adequately regulated before the original picture elements are divided and shifted to the positions of picture elements of a different color between adjacent picture elements of the same color. Thus the number of the picture elements can be increased eight times.

According to the first, second and third embodiments, a liquid crystal display panel is used as a display for producing an image by controlling the quantity of transmitted light in units of picture elements. A DMD projector can be employed to form the image by controlling the quantity of reflected light in units of picture elements. To produce the image by controlling the quantity of charged plasma in units of picture elements, a PDP is used. A FED is available to control the intensity of light collision with the screen due to an electron emission, in units of picture elements and thus form the image. For a flat display panel, the liquid crystal display panel is substituted by PDP, FED and DMD panels irrespective of the color filter pattern such as delta type or stripe type.

It will be seen that the image display device in accordance with the present invention leads to some practical results as follows.

The picture elements of an image formed on a flat display panel is divided by the amplitude division method and shifted to a distance larger than at least one cycle of the picture element. Thus the number of the picture elements is increased a designated number of times to eliminate the opaque zones caused by another color picture elements and enhance the quality of the image.

At least one double refraction plate is used to divide and shift the picture elements instead of polyhedral optical devices such as polyhedral flat plate, polyhedral prism and the like that causes a scattering of the effective light. It is possible to prevent the decrease in contrast due to the scattering of light, thus improving the quality of images.

Since the duplicated picture elements are shifted to other positions apart from the original picture elements to increase the number of picture elements, a user can watch the image on the screen at a closer distance.

The installation of the system and assembly arrangements are flexible because the double refraction plates of operations independent of other optical system are installed near the flat display panel.

It will be apparent to those skilled in the art that various modifications and variations can be made in an image display device of the present invention without departing from the spirit or scope of the invention. Thus, it is intended that the present invention cover the modifications and variations of this invention provided they come within the scope of the appended claims and their equivalents.

What is claimed is:

1. An image display device, which selectively projects an incident light onto a screen to produce an enlarged image, the display device comprising:

a light source;

image forming means for producing an image including picture elements using incident light generated from said light source; and optical means located on an optic axis between said image forming means and said screen, for dividing the picture elements of the image formed by said image forming means into duplication picture elements and shifting the duplication picture to other positions independent of positions of the picture elements, said optical means shifts the positions of the duplication picture elements by $\frac{3}{2} P_x$, wherein $P_x$ is horizontal pitch between picture elements as displayed on a flat display panel.

2. The image display device as defined in claim 1, further comprising projecting means for enlarging and projecting the image onto the screen, the picture elements of the image being divided into the duplication picture elements and the positions of the duplication picture elements being shifted by said optical means.

3. The image display device as defined in claim 1, wherein said image forming means produces the image by controlling a quantity of transmitted light in units of picture elements.

4. The image display device as defined in claim 1, wherein said image forming means produces the image by controlling a quantity of reflected light in units of picture elements.

5. The image display device as defined in claim 1, wherein said image forming means produces the image by controlling a quantity of charged plasma in units of picture elements.

6. The image display device as defined in claim 1, wherein said image forming means produces the image by controlling an intensity of light collision with the screen due to an electron emission, in units of picture elements.

7. The image display device as defined in claim 1, wherein said image forming means comprises a polarizer for converting a direction of propagation of the light into horizontal and vertical polarized components.

8. The image display device as defined in claim 7, wherein said polarizer has a polarization axis positioned inclined 45-degrees with respect to a crystalline optic axis of said optical means.

9. The image display device as defined in claim 1, wherein a horizontal component of the light generated from said image forming means passes though said optical means to display an original picture element, and a vertical component of the light is refracted by said optical means to display a duplication picture element.

10. The image display device as defined in claim 1, wherein said optical means is a flat plate.

11. The image display device as defined in claim 10, wherein the flat plate is made of a material that exhibits double refraction.

12. The image display device as defined in claim 1, wherein said optical means comprises plural flat plates.

13. The image display device as defined in claim 1, wherein a vertical component of the light generated from said image forming means passes through said optical means to display an original picture element, and a horizontal component of the light is refracted by said optical means to display a duplication picture element.

14. An image display device, which selectively projects an incident light onto a screen to produce an enlarged image, the image display device comprising:

a light source;

image forming means for producing an image including picture elements using incident light generated from said light source; and optical means located on an optical axis between said image forming means and said screen, for dividing the picture elements of the image formed by said image forming means into duplication picture elements and shifting the duplication picture elements to positions between picture elements having colors other than a color of the duplication picture elements.

15. The image display device as defined in claim 14, further comprising projecting means for enlarging and projecting the image onto the screen, the picture elements of the image being divided into duplication picture elements and the positions of the duplication picture elements being shifted by said optical means.

16. The image display device as defined in claim 14, wherein said image forming means produces the image by controlling a quantity of transmitted light in units of picture elements.

17. The image display device as defined in claim 14, wherein said image forming means produces the image by controlling a quantity of reflected light in units of picture elements.

18. The image display device as defined in claim 14, wherein said image forming means produces the image by controlling a quantity of charged plasma in units of picture elements.

19. The image display device as defined in claim 14, wherein said image forming means produces the image by controlling an intensity of light collision with the screen due to an electron emission, in units of picture elements.

20. The image display device as defined in claim 14, wherein said image forming means comprises a polarizer for converting a direction of deflection of the light into horizontal and vertical polarized components.

21. The image display device as defined in claim 20, wherein said polarizer has a polarization axis positioned inclined 45-degrees with respect to a crystalline optic axis of said optical means.

22. The image display device as defined in claim 14, wherein a horizontal component of the light generated from said image forming means passes through said optical means to display an original picture element, and a vertical component of the light is refracted by said optical means to display a duplication picture element.

23. The image display device as defined in claim 14, wherein said optical means is a flat plate.

24. The image display device as defined in claim 23, wherein said flat plate is made of a material that exhibits double refection.

25. The image display device as defined in claim 14, wherein said optical means comprises plural flat plates.

26. The image display device as defined in claim 14, wherein said optical means shifts the positions of the duplication picture elements by $\frac{3}{2}P_x$, wherein $P_x$ is horizontal pitch between picture elements as displayed on a flat display panel.

27. The image display device as defined in claim 14, wherein a vertical component of the light generated from said image forming means passes through said optical means to display an original picture element, and a horizontal component of the light is refracted by said optical means to display a duplication picture element.

28. An image display device, which selectively projects an incident light onto a screen to produce an enlarged image, the image display device comprising:

a light source;

image forming means for producing an image including picture elements using incident light generated from said light source; and optical means located on an optical axis between said image forming means and the screen, for dividing the picture elements of the image formed by said image forming means and shifting the divided picture elements by $\frac{3}{2}P_x$, wherein $P_x$ is horizontal pitch between picture elements as displayed on a flat display panel.

29. The image display device as defined in claim 28, wherein a horizontal component of the light generated from said image forming means passes though said optical means to display an original picture element, and a vertical component of the light is refracted by said optical means to display a divided picture element.

30. The image display device as defined in claim 28, wherein said optical means is a flat plate.

31. The image display device as defined in claim 30, wherein the flat plate is made of a material that exhibits double refraction.

32. The image display device as defined in claim 28, wherein said optical means comprises plural flat plates.

33. The image display device as defined in claim 28, wherein a vertical component of the light generated from said image forming means passes through said optical means to display an original picture element, and a horizontal component of the light is refracted by said optical means to display a divided picture element.

34. An image display device, which selectively projects an incident light onto a screen to produce an enlarged image, the image display device comprising:

a light source;

image forming means for producing an image including picture elements using incident light generated from said light source;

polarizing means for converting a direction of propagation of the image generated by said image forming means into horizontal and vertical polarized components;

optical means located on an optical axis between said polarizing means and the screen, for dividing the picture elements of the image formed by said image forming means into duplication picture elements and shifting positions of the duplication picture elements a distance farther than pitch between picture elements as displayed; and image enlarging means for enlarging the image formed by the picture elements and the duplication picture elements generated by said optical means and projecting the picture elements and the duplication picture elements onto the screen.

35. The image display device as defined in claim 34, wherein said image forming means produces the image by controlling a quantity of transmitted light in units of picture elements.

36. The image display device as defined in claim 34, wherein said image forming means produces the image by controlling a quantity of reflected light in units of picture elements.

37. The image display device as defined in claim 34, wherein said image forming means produces the image by controlling a quantity of charged plasma in units of picture elements.

38. The image display device as defined in claim 34, wherein said image forming means produces the image by controlling an intensity of light collision with the screen due to an electron emission, in units of picture elements.

39. The image display device as defined in claim 34, wherein said optical means shifts the positions of the duplication picture elements by $\frac{3}{2}P_x$, wherein $P_x$ is horizontal pitch between picture elements as displayed on a flat display panel.

40. The image display device as defined in claim 34, wherein said optical means comprises first and second double refraction plates arranged in sequence, said first and second double refraction plates being flat plates.

41. The image display device as defined in claim 40, wherein each of said first and second double refraction plates have crystalline optic axes corresponding to a direction of propagation of the light generated by said polarizing means.

42. The image display device as defined in claim 40, wherein said polarizing means has a polarization axis inclined 45-degrees with respect to a horizontal direction of propagated light, a crystalline optic axis of said first double refraction plate is positioned along the horizontal direction, and a crystalline optic axis of said second double refraction plate is inclined along a designated degree with respect to the horizontal direction.

43. The image display device as defined in claim 40, wherein said polarizing means has a polarization axis along a horizontal direction of propagated light, a crystalline optic axis of said first double refraction plate is positioned inclined along a designated degree with respect to the horizontal direction, and a crystalline optic axis of said second double refraction plate is along the horizontal direction.

44. The image display device as defined in claim 34, wherein said optical means comprises first, second and third double refraction plates arranged in sequence, said double refraction plates being flat plates.

45. The image display device as defined in claim 44, wherein each of said first, second and third double refraction plates have crystalline optic axes corresponding to direction of propagation of the light generated by said polarizing means.

46. The image display device as defined in claim 44, further comprising a polarizer for converting the light generated by said image forming means and passing through said double refraction plates to have a propagation direction at an adequate angle corresponding to crystalline optic axes of said double refraction plates.

47. The image display device as defined in claim 44, wherein said polarizing means has a polarization axis inclined 45-degrees with respect to a horizontal direction of propagated light, crystalline optic axes of said first and third double refraction plates are positioned along the horizontal direction, and a crystalline optic axis of said second double refraction plate is inclined along a designated degree with respect to the horizontal direction.

48. The image display device as defined in claim 44, further comprising a polarizer on an optic axis between said polarizing means and said first double refraction plate, said polarizer having a polarization axis inclined 45-degrees with respect to a horizontal direction of propagated light, a polarization axis of said first double refraction plate is positioned along the horizontal direction.

49. The image display device as defined in claim 44, further comprising a polarizer on an optic axis between said polarizing means and said first double reflection plate, wherein said polarizer is a $\lambda/4$ plate.

50. The image display device as defined in claim 44, further comprising a polarizer on an optic axis between said polarizing means and said first double refraction plate, wherein said polarizer is a $\lambda/2$ plate.

51. The image display device as defined in claim 48, wherein crystalline optic axes of said first and third double refraction plates are positioned along the horizontal direction, and a crystalline optic axes of said second double refraction plate is inclined a designated degree with respect to the horizontal direction.

52. The image display device as defined in claim 44, further comprising a polarizer on an optic axis between said second and third double refraction plates, said polarizer having a polarization axis inclined 45-degrees with respect to a horizontal direction of propagated light, crystalline optic axes of said second and third double refraction plates are positioned along the horizontal direction.

53. The image display device as defined in claim 52, wherein a crystalline optic axis of said first double refraction plate is positioned inclined a designated degree with respect to the horizontal direction.

54. The image display device as defined in claim 44, wherein a polarization axis of said polarizing means is positioned along a horizontal direction of propagated light, crystalline optic axes of said first and third double refraction plates are inclined a designated degree with respect to the horizontal direction, and a crystalline optic axis of said second double refraction plate is along the horizontal direction.

* * * * *